(12) United States Patent
Yerebakan et al.

(10) Patent No.: US 11,645,447 B2
(45) Date of Patent: May 9, 2023

(54) ENCODING TEXTUAL INFORMATION FOR TEXT ANALYSIS

(71) Applicant: Siemens Healthcare GmbH, Erlangen (DE)

(72) Inventors: Halid Yerebakan, Malvern, PA (US); Yoshihisa Shinagawa, Downingtown, PA (US)

(73) Assignee: Siemens Healthcare GmbH, Erlangen (DE)

( * ) Notice: Subject to any disclaimer, the term of this patent is extended or adjusted under 35 U.S.C. 154(b) by 138 days.

(21) Appl. No.: 16/846,756

(22) Filed: Apr. 13, 2020

(65) Prior Publication Data

US 2020/0334410 A1 Oct. 22, 2020

(30) Foreign Application Priority Data

Apr. 18, 2019 (EP) ..................................... 19170335

(51) Int. Cl.
*G06F 40/126* (2020.01)
*G06F 40/284* (2020.01)
*G06F 40/58* (2020.01)
*G06F 40/205* (2020.01)

(52) U.S. Cl.
CPC .......... *G06F 40/126* (2020.01); *G06F 40/205* (2020.01); *G06F 40/284* (2020.01); *G06F 40/58* (2020.01)

(58) Field of Classification Search
CPC .... G06F 40/126; G06F 40/205; G06F 40/284; G06F 40/58; G06F 40/30

USPC .......................................................... 715/200
See application file for complete search history.

(56) References Cited

U.S. PATENT DOCUMENTS

| | | | |
|---|---|---|---|
| 10,573,312 B1* | 2/2020 | Thomson | G10L 15/187 |
| 10,635,753 B2* | 4/2020 | Shin | G06N 3/08 |
| 2011/0307245 A1* | 12/2011 | Hanneman | G06F 40/45 704/4 |
| 2022/0083746 A1* | 3/2022 | Chen | G06N 3/045 |

OTHER PUBLICATIONS

Sennrich, Rico, et al. "Neural Machine Translation of Rare Words with Subword Units." arXiv 1508.07909, 2016., arxiv.org/abs/1508.07909. (Year: 2016).*

(Continued)

*Primary Examiner* — Stephen S Hong
*Assistant Examiner* — Broderick C Anderson

(57) ABSTRACT

A computer-implemented method of encoding a word for use in a method of text analysis comprises receiving input text to be analysed, the input text comprising a first word which is not represented in a vocabulary set stored on a storage. The vocabulary set comprises a plurality of words and an associated word embedding vector for each word in the set. The method comprises identifying the first word as a word which is not represented in the vocabulary set and determining one or more sub-words within the first word with which to encode the first word. Each of the one or more sub-words corresponds with a word represented in the vocabulary set and having an embedding vector in the vocabulary set. The method comprises determining an encoding for the first word based on the one or more sub-words.

20 Claims, 4 Drawing Sheets

(56) References Cited

OTHER PUBLICATIONS

Armand Joulin, Edouard Grave, Piotr Bojanowski, and Tomas Mikolov. 2016. Bag of tricks for efficient text classification. arXiv preprint arXiv:1607.01759. (Year: 2016).*

Philipp Koehn and Kevin Knight. 2003. Empirical Methods for Compound Splitting. In EACL '03: Proceedings of the Tenth Conference on European Chapter of the Association for Computational Linguistics, pp. 187-193, Budapest, Hungary. Association for Computational Linguistics. (Year: 2003).*

Kudo, Taku. "Subword regularization: Improving neural network translation models with multiple subword candidates." arXiv preprint arXiv:1804.10959 (2018). (Year: 2018).*

Salle, Alexandre et al: "Incorporating Subword Information into Matrix Factorization Word Embeddings"; arxiv.org; Cornell University Library, 201 Olin Library Cornell University Ithaca, NY 14853; May 9, 2018; pp. 1-6.

B0jan0wski, Piotr et al: "Enriching Word Vectors with Subword Information"; arxiv.org; Cornell University Library; 201 Olin Library Cornell University Ithaca, NY 14853; Jul. 15, 2016; pp. 1-7.

Zhao, Jinman et al: "Generalizing Word Embeddings using Bag of Subwords"; arxiv.org; Cornell University Library; 201 Olin Library Cornell University Ithaca, NY 14853; Sep. 12, 2018.

Chaudhary, Aditi et al: "Adapting Word Embeddings to New Languages with Morphological and Phonological Subword Representations"; arxiv.org; Cornell University Library; 201 Olin Library Cornell University Ithaca, NY 14853; Aug. 28, 2018; pp. 1-12.

Creutz, Mathias et al: "Morph-based speech recognition and modeling of out-of-vocabulary words across languages"; ACM Transactions on Speech and Language Processing (TSLP); Association for Computing Machinery, Inc; New York, USA; vol. 5; No. 1; Dec. 12, 2007; pp. 1-29; XP058232088 ISSN: 1550-4875; DOI: 10.1145/1322391.1322394.

Li, Bofang et al: "Subword-level Composition Functions for Learning Word Embeddings"; Proceedings of the Second Workshop on Subword/Character Level Models; Jun. 6, 2018; pp. 38-48; XP055633522; Stroudsburg, PA, USA; DOI: 10.18653/V1/W18-1205.

* cited by examiner

ENCODING TEXTUAL INFORMATION FOR TEXT ANALYSIS

CROSS REFERENCE TO RELATED APPLICATIONS

This application claims the benefit of priority of EP Application No. 19170335.4 filed on Apr. 18, 2019, which is hereby incorporated by reference.

TECHNICAL FIELD

The present invention relates to encoding textual information for use in text analysis.

BACKGROUND

With the volume of textual information generated and stored ever increasing, there is a need for effective and efficient methods of processing such textual information, for example to extract from text information which is relevant to a specific task or to allow translation of textual information from one natural language to another. For example, in the field of medical science, there is often a need to retrieve information from textual documents, such as medical text reports, that relate to a specific topic. For example, a medical doctor may require retrieval of medical reports of findings related to lung diseases. In other examples, there may be a need to efficiently translate text generated in one natural language into another natural language. For example, it may be necessary for medical reports written in German to be translated into English.

Example text analysis processes (also referred to as text analytics processes) may be performed by a computer implemented algorithm, and it is known to perform such tasks by machine learning techniques. Machine learning algorithms may be trained to model natural languages and to extract information from, or otherwise process, text provided in such natural languages.

Some example machine learning techniques represent words of a text being analysed with a multi-dimensional vector, referred to as an embedding vector. In some examples, embedding vectors may be obtained by training a machine learning algorithm on a corpus of textual information comprising a plurality of words. A corpus of textual information may comprise a body of natural language text exemplifying usage of that natural language. Using the corpus of textual information, the machine learning algorithm may obtain multi-dimensional embedding vectors for a plurality of words appearing in the corpus.

Words and their associated embedding vectors may be arranged in a vocabulary set, which, for example, comprises a table of the words and their embedding vectors for being stored and used in a machine learning task. In certain examples, the vocabulary set may for each word also store a parameter related to a frequency with which the word appears in the corpus of textual information.

In some examples a vocabulary set may comprise a standard database of words and associated embedding vectors where these embedding vectors have been obtained by "pre-training" on a corpus of textual information.

In examples, a computer implemented text analysis task involves use of a vocabulary set to perform the task. The computer performing the task may access the vocabulary set to obtain embedding vectors for words appearing in text to be analysed. To perform the task the computer may use vectors obtained from the vocabulary set in a known text analysis method, examples of which are described below.

In some examples, a particular word in text to be analysed may not exist in the vocabulary being used. As such, the computer performing the task does not have available to it an embedding vector to represent the word. This may occur where a word in the text to be analysed is not present in the corpus used to obtain the vocabulary set, or the word appears only rarely in the corpus, such that an algorithm training the vocabulary set has insufficient information to obtain an embedding vector for the word. In examples, the vocabulary set used for the text analysis task may comprise a limited number of words. For example, a vocabulary set comprising a relatively small number of words may be used in order to limit the use of computational resources in using the vocabulary set.

A word not occurring in a vocabulary set being used and not having an embedding vector associated with it may be referred to as an "out-of-vocabulary word". In some examples, a loss of information may result if a machine performing a text analysis task encounters an out-of-vocabulary word, because the machine is unable to represent the word with an embedding vector. This loss of information relating to the out-of-vocabulary word may negatively affect the accuracy or effectiveness of the text analysis task. In particular, if the out-of-vocabulary word is a key differentiator in a sentence being analysed, the inability to represent that word with an embedding may have a significant negative effect on the effectiveness of the method.

SUMMARY

According to a first aspect of the present invention there is provided a computer-implemented method of encoding a word for use in a method of text analysis, the method comprising: receiving input text to be analysed, the input text comprising a first word which is not represented in a vocabulary set stored on a storage, the vocabulary set comprising a plurality of words and an associated word embedding vector for each word in the set; identifying the first word as a word which is not represented in the vocabulary set; determining one or more sub-words within the first word with which to encode the first word, each of the one or more sub-words corresponding with a word represented in the vocabulary set and having an embedding vector in the vocabulary set; and determining an encoding for the first word based on the one or more sub-words.

The first word may be segmentable in more than one way, each way of segmenting the first word providing a segmentation, and each segmentation comprising one or more sub-words, and: determining the one or more sub-words to be used to encode the first word may comprise selecting one of the segmentations of the first word.

Selecting one of the segmentations of the first word to obtain one or more sub-words may comprise: selecting the segmentation of the first word based on pre-determined criteria relating to the segmentations.

Selecting the segmentation of the first word to produce sub-words may comprise selecting a segmentation comprising a lower or lowest number of sub-words of each of the segmentations.

A pre-determined criterion based upon which the segmentation of the first word is selected may relate to a frequency associated with the sub-words produced by each of the segmentations.

Selecting one of the segmentations of the first word may comprise determining a scoring value for each of the segmentations based on the number of sub-words and the frequency associated with the sub-words produced by each segmentation and selecting the segmentation based on a comparison of the scoring values. The scoring values may be determined based on a weighted sum of a first term relating to the number of sub-words produced by each segmentation and a second term relating to the frequency of the sub-words produced by each segmentation.

The vocabulary set may comprise individual characters of a natural language of the input text and may have embedding vectors associated with the individual characters. In some examples, the first word may be segmented to provide one or more sub-words comprising a plurality of characters and one or more sub-words comprising an individual character.

The vocabulary set may comprise fewer than 500,000 words. The vocabulary set may comprise around 100,000 words.

The vocabulary set may be the Fasttext 100 k vocabulary set or a Glove vocabulary set.

According to a second aspect of the present disclosure there is provided a method of applying a computer implemented text analysis process to natural language text to obtain a text analysis result, the natural language text comprising one or more words not present in a vocabulary set stored on a storage; wherein the computer implemented text analysis process comprises: identifying and encoding, using the method according to the first aspect of the present disclosure, each word in the natural language text which does not correspond with a word in the vocabulary set to obtain an encoding for each word not present in the vocabulary set; obtaining from the vocabulary set, for each word of the natural language text which corresponds to a word in the vocabulary set and for each sub-word of the encoding, an embedding vector; determining, based on the obtained embedding vectors, and using a text analysis model, a text analysis result.

The text analysis model may be a text classification model and the method may be a method of obtaining a classification of the natural language text.

The text analysis model may be a translation model and the method may be a method of obtaining a translation of the natural language text from a first natural language into a second natural language.

According to a third aspect of the present disclosure there is provided a set of machine-readable instructions which when executed by a processor cause a method according to the first aspect of the present disclosure or according to the second aspect of the present disclosure to be performed.

According to a fourth aspect of the present disclosure there is provided a machine-readable medium comprising a set of machine-readable instructions according to the third aspect of the present disclosure.

According to a fifth aspect of the present disclosure there is provided apparatus comprising a processor and a storage comprising a set of machine-readable instructions which when executed by the processor cause the processor to perform a method according to the first aspect of the present disclosure or according to the second aspect of the present disclosure.

DETAILED DESCRIPTION

Figure 1:
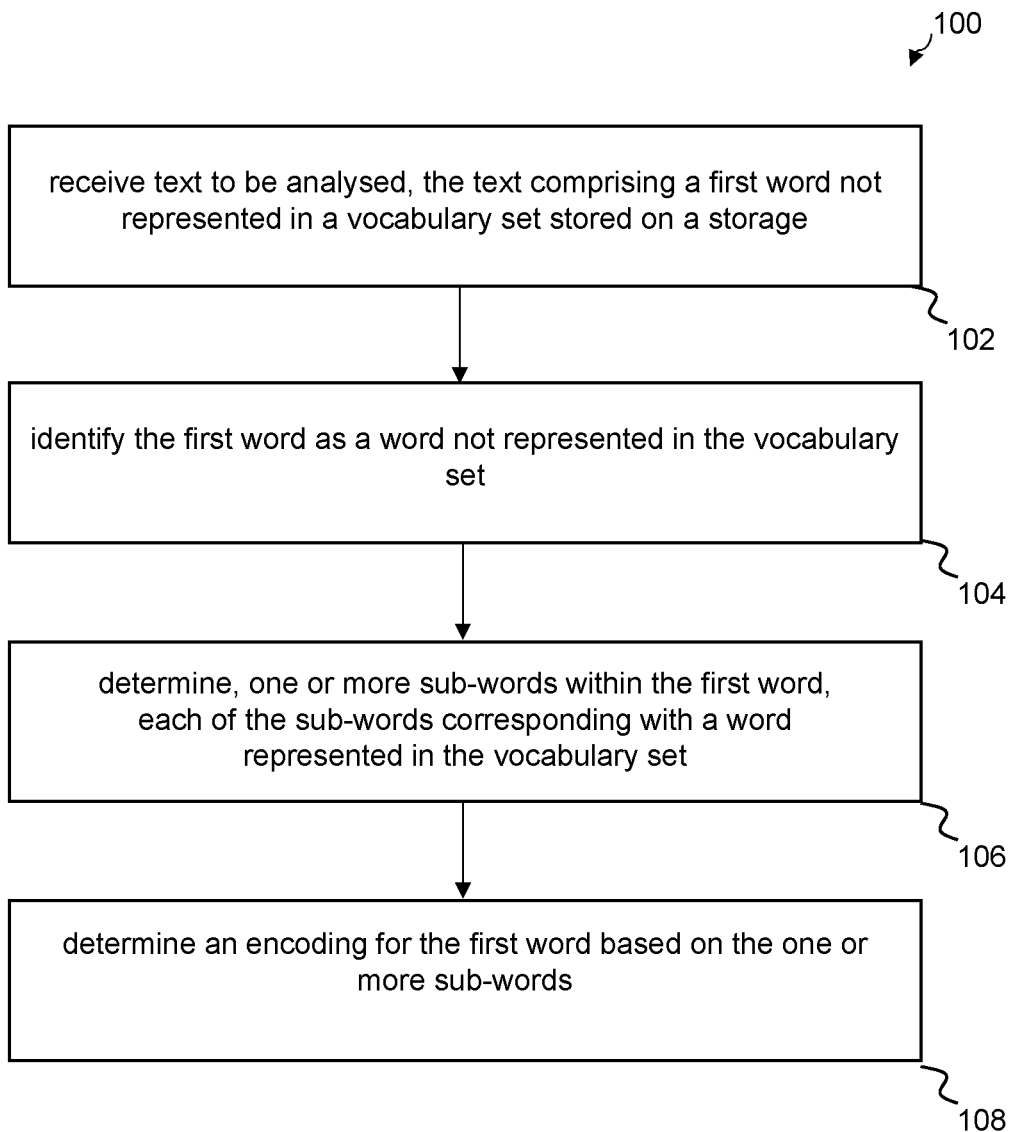
FIG. 1 is a flow diagram illustrating schematically a method according to an example.

Referring to FIG. 1, there is illustrated a method of encoding a word for use in text analysis. The method is implemented by a computer. The word for being encoded by the method illustrated by FIG. 1 is referred to as a first word. The computer performing the encoding has available to it a vocabulary set comprising a plurality of words with associated embedding vectors. The first word is a word which is not present in the vocabulary set.

The vocabulary set comprises a plurality of words each associated with a word embedding comprising a vector representing the word in a multidimensional space. Words of a training corpus of text may be used to build the vocabulary set using an appropriate algorithm, examples of which will be described below. In practice, the vocabulary set may not contain all of the words of a given natural language to which the vocabulary set corresponds. For example, the vocabulary set may be of limited size, e.g. comprising less than around 500,000 words, or around 100,000 words. Accordingly, words appearing in text to be analysed may be absent from the vocabulary set and thus may not have an associated word embedding vector.

Word embeddings may be mappings of individual words or phrases of the vocabulary onto real-valued vectors representative thereof in a multidimensional vector space. Each vector may be a dense distributed representation of the word in the vector space. Word-embeddings may be learned/generated to provide that words or phrases that have a similar meaning have a similar representation in vector space.

Word embeddings may be learned using machine learning techniques. Word embeddings may be learned/generated for words of the vocabulary of a corpus of text. Word embeddings may be learned/generated using a training process applied on the corpus of text. The training process may be implemented by a deep learning network, for example based on a neural network. For example, the training may be implemented using a Recurrent Neural Network (RNN) architecture, in which an internal memory may be used to process arbitrary sequences of inputs. For example, the training may be implemented using a Long Short-Term Memory (LSTM) based Recurrent Neural Network (RNN) architecture, for example comprising one or more LSTM cells for remembering values over arbitrary time intervals, and/or for example comprising gated recurrent units (GRU). The training may be implemented using a convolutional neural network (CNN). Other suitable neural networks may be used. The word embeddings may be learned using various techniques, for example Word2vec, Glove, Fasttext or similar.

Various models may be employed for learning/generating word embeddings such as those stored in the vocabulary set. For example, word embeddings may be learned using a skip-gram model implemented on a neural network. The skip-gram model may learn word embeddings for words given the local usage context of the words, where the context for the word for which a word embedding is being learned is defined by a window of neighbouring words. This window is a configurable parameter of the model. The skip-gram model may learn the word embeddings by predicting words that surround a given word. For example, all words of a corpus of text may be used to build the vocabulary. The word embeddings may initially map each word onto a vector of a given dimensionality that is populated with randomly generated numbers. The skip-gram model may take a word of the vocabulary and using the word embedding associated with that word attempt to predict words that surround that word in a given window. The skip-gram model may then compare the predictions with words that actually surround that word in the corpus of text and adjust word embeddings accordingly on the basis thereof. This process may be recursively applied until accurate word embeddings are generated. Other suitable models for learning word embeddings may be applied. The vector mapped by the word embeddings may be dense, i.e. of relatively low dimension, for example as compared to sparse word representations, allowing for efficient implementation.

In examples, the word embeddings of the vocabulary set are pre-learned (or "pre-trained"). For example, the vocabulary and the word-embeddings thereof may be obtained from a database, for example downloaded via the internet, and may comprise a plurality of words and embeddings for those words learned by a method such as described above. In some examples, the vocabulary set for the computer implemented text analysis task to be performed by the method of FIG. 1 may be selected from a plurality of available vocabulary sets comprising different sets of words and pre-trained embedding vectors.

For example, available pre-trained vocabulary sets from which to select the vocabulary set may comprise around 30,000 to 50,000 words, or around 100,000 words, or around 500,000 words, or around 2 million words, or more than 2 million words. Examples of such pre-trained vocabulary sets are Fasttext 100 k—which comprises 100,000 of the most common English words, and Fasttext 2M—which comprises 2,000,000 English words. In some examples the vocabulary set for performing the text analysis task may be chosen taking into account considerations of the computational resources required to use the particular vocabulary set. A vocabulary set with a relatively limited number of words, such as Fasttext 100 k, may be selected for use in a particular task to provide efficient use of computational resources.

Referring again to FIG. 1, in broad overview, the method comprises the following blocks 102 to 106.

At block 102, the method comprises receiving as an input text to be analysed. The text to be analysed comprises one or more words in a natural language. For example, the input text to be analysed may comprise a medical report written in English or German. The text analysis task to be performed may be to classify the input text, or to translate the input text into another natural language. Examples of such text analysis tasks will be discussed in more detail below.

A vocabulary set is stored on a storage and is available for being accessed by the computer implementing the method. The input text to be analysed comprises a word, referred to herein as a first word, which is not represented in the vocabulary set. At block 104, the method comprises identifying the first word as a word which is not represented in the vocabulary set and which accordingly does not have an associated word embedding vector in the vocabulary set.

Figure 2:
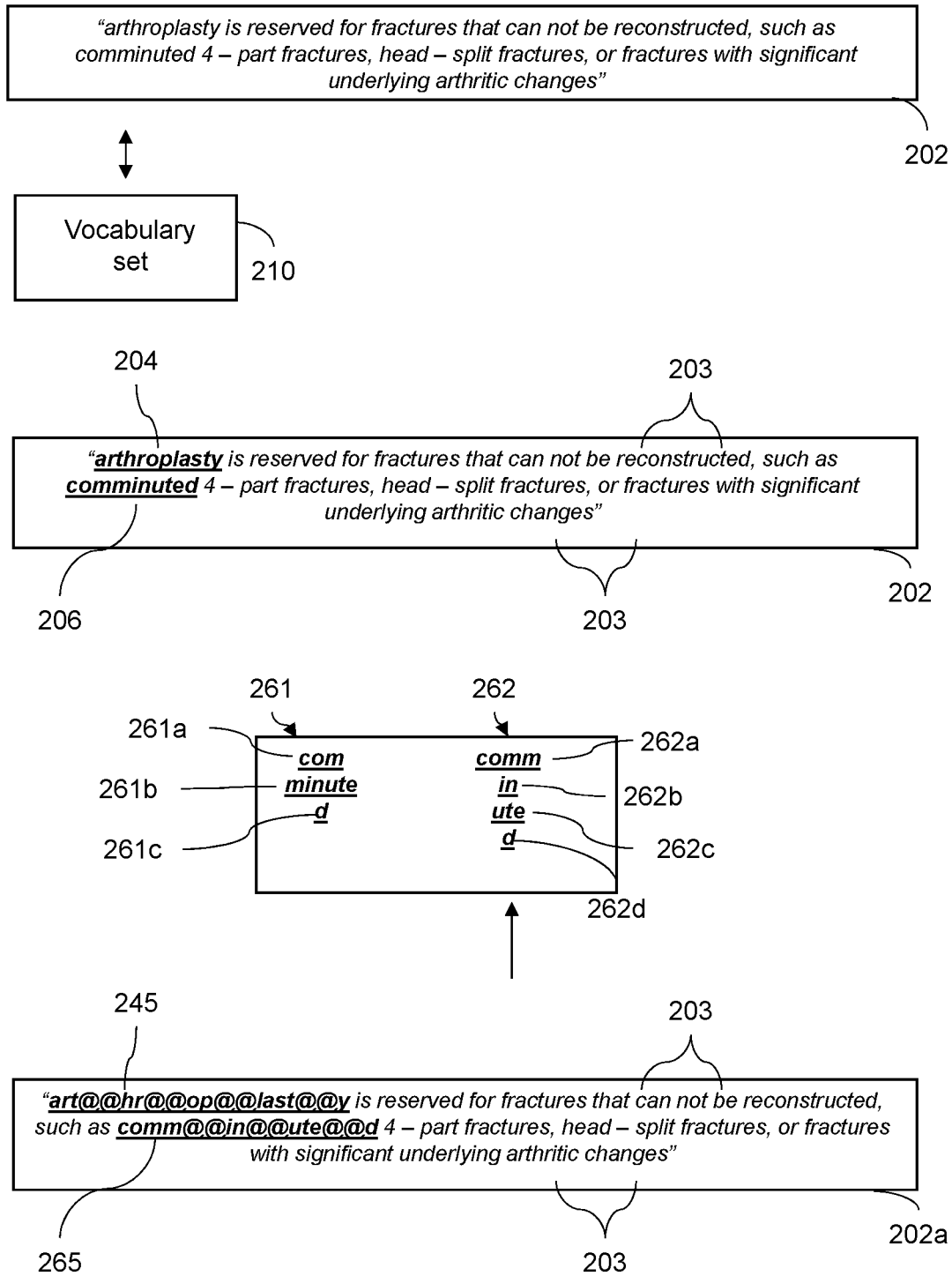
FIG. 2 is a block diagram illustrating schematically a method according to an example.

FIG. 2 shows one example of a method according to FIG. 1. The input text 202 in this example is a section of a medical report. The vocabulary set 210 used in this example method is the Fasttext 100 k vocabulary. The input text 202 comprises one or more first words, in this example two words, "arthroplasty" 204 and "comminuted" 206, which are not represented in the Fasttext 100 k vocabulary set 210. Further words 203 in the input text 202 are present in the FastText 100 k vocabulary set 210 (wherein not all such words are labelled in FIG. 2). Methods described herein for encoding a first word not present in the vocabulary set 210 in examples are performed for each word of the input text 202 not appearing the in vocabulary set 210. For example, for the example input text 202 of FIG. 2, a method according to FIG. 1 is performed to provide an encoding of both out-of-vocabulary words 204, 206.

Example methods at block 104 may comprise performing a look-up for each of the words in the input text 202 in the vocabulary set 210. The first words 204, 206 are both identified as not being present in the vocabulary set 210. The remainder of the words 203 of the input text 202 are found to be present in the vocabulary set 210 and thus have known embedding vectors associated therewith in the vocabulary set 210.

In one example, at block 104, if a look-up for a word of the input text 202 in the vocabulary set 210 is unsuccessful, then another look-up may be performed for the word with one or more characteristics of the word changed. For example, one or more of the letters of a word in the input text 202 may be changed between upper case and lower case. For example, an example word may be represented in the input text 202 consisting of all lower-case letters. A look-up for the word in this form in the vocabulary set 210 may be initially unsuccessful. An example of the method 100 may comprise changing the case of one or more of the letters of a word of the input text 202, for example the first letter of the word, to upper-case and again performing a look-up in the vocabulary set 210. In some examples, an additional look-up for the word after modifying a case of one or more of the letters may successfully identify the word as being present in the vocabulary set 210. In such an example, an embedding vector for the word is found in the vocabulary set 210 and the word is accordingly not identified as an out-of-vocabulary word.

At block 106, for each first word 204, 206 which is identified at block 104 as not being present in the vocabulary set 210, the method comprises determining one or more sub-words within the first word 204, 206 with which to encode the first word 204, 206.

As used herein, a sub-word is a set of one or more characters within an out-of-vocabulary word, such as the first word 204, which form a word which is present in the vocabulary set. For example, the first word may be made up of a plurality of characters, e.g. letters of a given natural language, and the first word may be segmented to provide combinations of consecutive letters or individual letters within the first word which form a word that is present in the vocabulary set. In some examples, the first word may be segmentable to provide more than one sub-word. A sub-word may in some examples comprise only a single character, for example where the sub-word is a word in the vocabulary set 210 of only one character in length such as the English word "a". Furthermore, in some examples individual characters which do not typically form a word in normal usage of a natural language are included in the vocabulary set 210. For example, the Fasttext 100 k vocabulary set contains embedding vectors for all individual letters of the alphabet of the English language and such individual letters are accordingly considered sub-words for use in example methods described herein. In examples, all of the segments produced by segmenting the first word are sub-words having an embedding vector in the vocabulary set.

To give an example, referring to FIG. 2, one of the out-of-vocabulary words is the first word "arthroplasty" 204, which may in one example be segmented as follows to provide a first segmentation 241 of the word 204 comprising a set of sub-words:

"art" 241a;
"hr" 241b;
"op" 241c;
"last" 241d;
"y" 241e.

That is, in this example, it can be seen that the out-of-vocabulary first word 204 can be segmented or divided into the five sub-words 241a-e. Each of these sub-words 241a-e are present in the vocabulary set 210. One of the sub-words 241e is the individual letter "y".

In some examples it may be possible to segment the first word 204 in a plurality of different ways, with each different way of dividing the first word providing a different segmentation of the word and each different segmentation comprising two or more different sub-words. For example, the word 206, "comminuted", which is not in the Fasttext 100 k vocabulary set, may be alternatively segmented in the following ways, to produce alternative segmentations:

A first segmentation 261 of the word "comminuted" 206 comprises a first set of sub-words:

"com" 261a;
"minute" 261b; and
"d" 261c.

A second segmentation 262 of the word "comminuted" 206 provides a second set of sub-words:

"comm" 262a;
"in" 262b;
"ute" 262c; and
"d" 262d.

An example of the method 100, at block 106, may comprise selecting one of the segmentations, for example for the word 206 one of the first segmentation 261 and the second segmentation 262, of the first word to provide the one or more sub-words with which to represent the first word.

In examples, the method 100 comprises selecting the one of the segmentations of the first word by comparing to pre-determined criteria the sets of sub-words which each of the segmentations comprises. For example, in the example of FIG. 2 for the word "comminuted" 206, the method 100 may comprise selecting the one of the segmentations 261, 262 of the word 206 by comparing to pre-determined criteria the sets of sub-words 261a-c, 262a-d which each of the segmentations 261, 262 comprises.

In one example, a pre-determined criterion upon which a segmentation is selected may relate to a number of sub-words each of the segmentations comprises. For example, in one example method a segmentation of the first word may be selected which comprises a lower or lowest number of sub-words. For example, using this criterion, the first segmentation 261 of the first word 206 may be selected over the second segmentation 262, since the first segmentation 261 comprises three sub-words 261a-c while the second segmentation 262 comprises four sub-words 261a-d. In some examples, selecting the segmentation comprising a lower or lowest number of sub-words may produce an encoding for the first word which allows more accurate text analysis results to be achieved. For example, a segmentation with a lower or lowest number of sub-words may comprise sub-words which have a similar meaning to the first word. For example, where the first word is a morphological variant of a particular word, for example where the first word is a plural of a "root" word, the segmentation comprising the lowest number of sub-words may provide the root word as a sub-word. The root word may be similar in meaning to the first word and thus selecting the root word as a sub-word may be advantageous in that the embedding vector of the root word may provide a more suitable representation of the first word than a sub-word whose meaning is not related to the meaning of the first word.

In another example, a pre-determined criterion used when selecting a segmentation may relate to a characteristic of the sub-words each segmentation comprises. One such characteristic may relate to a frequency with which the sub-words appear in the natural language to which the words of the vocabulary set belong. That is, the vocabulary set 210 may store for each word in the vocabulary set 210 a frequency, wherein the frequency may be representative of a frequency with which the word appears in the textual corpus used to train the vocabulary set 210. It may be advantageous to use sub-words having a higher frequency to represent the first word 206 since an embedding vector of a word in the vocabulary having a high frequency may more accurately represent the word, for example, since the embedding stored in the vocabulary has been calculated based on a high number of instances of the word in a text corpus. Conversely, a low frequency associated with a word in a vocabulary set indicates that the embedding vector for that word was determined based on a low number of instances of the word in a text corpus. Accordingly, an embedding vector for a word in the vocabulary set with a low frequency may be less reliable than an embedding vector for a high frequency word.

In some examples of the method described herein, a formula may be used to produce a scoring value for each of the available segmentations of the first word into sub-words. One example of a formula for providing a scoring value is as follows:

$$\text{length(wordindices)} + 5 * \text{median(wordindices)} / \text{max\_index}$$

The above example formula provides a scoring value for a given segmentation of the first word based on a weighted sum of a term depending on the number of sub-words in the segmentation and a term depending on the frequencies associated with the sub-words.

In the above formula, "wordindices" is an array which stores an index associated with each of the sub-words of a given segmentation of the first word. The index associated with each of the sub-words is a number denoting the position of that word in the vocabulary set, when the words of the vocabulary set are ordered by frequency. For example, the vocabulary set may comprise 100,000 words which when ordered by frequency, in descending order, have indices from 1 to 100,000 where the word having index 1 is the word in the vocabulary set having the highest frequency and the word having index 100,000 is the word in the vocabulary set having the lowest frequency. Therefore, for example, if the given segmentation comprises three sub-words which are the $5^{th}$, $500^{th}$, and $105^{th}$ most common words in the vocabulary set then for that segmentation wordindices=[5, 500, 105].

The array "wordindices" has a length equal to the number of sub-words in the given segmentation of the first word. In the above example the first term "length (wordindices)" provides the number of sub-words in the given segmentation.

In this example, the frequency of the sub-words in the segmentation is taken into account by the second term, which is based on a median value of the index of the sub-words in the segmentation ("median(wordindices)"). A low median value indicates that the segmentation comprises sub-words that have a low index value, and thus a high frequency in the vocabulary set. In this example, the median value is divided by a maximum index value (max_index) in the vocabulary set, e.g. 100,000 in a vocabulary set of 100,000 words, to provide a ratio of the median index value associated with the given segmentation to the maximum possible index value.

The terms in the formula may be weighted in some examples. For example, in the above formula, the first term which takes into account the number of sub-words in the segmentation is multiplied by 1 while the second term taking into the frequency of the sub-words is multiplied by 5. In this example, due to the weighting of the terms, if a segmentation contains a very rare word (having a high index value) the value of the second term may be large and the scoring value for the segmentation accordingly may be large. In examples, the segmentation which has the lowest scoring value using the above formula is chosen for encoding the first word. Thus, a segmentation containing a very rare word may be heavily penalised against selection by the above formula. However, it will be noted that since the second term contains a ratio while the first term will typically have a magnitude of 2 or greater, the 5× weighting of the second term does not necessarily heavily weight the formula to the dominated by the second term in all cases.

In an example, the above formula could be implemented in Python using "len(wordindices)" for the first term and np.median(wordindices) to compute the median value of the wordindices array.

As mentioned above, the above formula is used to produce a scoring value for each of the available segmentations and the segmentation to be used for encoding the first word is selected based on these scoring values. In this example, the segmentation with the lowest scoring value is chosen, which accords with selecting the segmentation to be used based on a weighted combination of the segmentation containing a low number of sub-words and/or high frequency sub-words.

In other examples, different formulas may be used for scoring potential segmentations for ranking against one another. For example, different weightings of the terms in the above formula may be used, and the weighting may be selected based on testing to indicate relative weighting values for the two terms which give accurate results when applied to provide encodings for a text analysis method.

For example, to select one of the segmentations 261, 262 the method may comprise looking up in the vocabulary set 210 which of the sets 261a-c, 261a-d of sub-words have higher frequencies associated therewith in the vocabulary set 210. This information may be obtainable by performing a look-up of the sub-words 261a-c, 262a-d in the vocabulary set 210.

In the above example, a look-up of the sub-words 261a-c, 262a-d of the two segmentations 261, 262 may indicate that the second segmentation 261 comprises sub-words 261a-d having a higher frequency than the sub-words 261a-c of the first segmentation 261. In this example, based on this example criterion the method 100 may, for example, favour the second segmentation 262, as is indicated in FIG. 2.

In examples, the method 100 may apply a plurality of pre-determined criterion to select a segmentation of the word 206 and any other out-of-vocabulary words, such as the word 204, in the input text 202. For example, any suitable heuristic or metric may be used to determine the way of segmenting the word 206. The heuristic may comprise an algorithm using a one pre-determined criterion or a pre-determined combination of a plurality of pre-determined criteria, where examples of such pre-determined criteria have just been described.

In examples, if the word being segmented does not comprise any sub-words greater existing in the vocabulary set 210 which are greater than one character in length, then in an example the method segments the word into its individual characters, which then form the set of sub-words to be used to encode the word.

At block 108 the method 100 comprises determining an encoding for the first word 204, 206 using the one or more sub-words determined at block 106. In examples the one or more sub-words which the segmentation selected at block 106 comprises are used to determine an encoding for the first word 206.

In the example shown in FIG. 2, the second segmentation 262 of the word 206 is selected. Therefore, the sub-words determined for encoding the word 206 are the second set 262a-d of sub-words and an encoding "comm@@in@@ute@@d" 265 of the word 206 is determined, where "@@" is used in the encoding 265 as a segmentation marker to separate the sub-words 262a-d from one another, for example to allow the sub-words to be recognised as such when input into a neural network for performing a text analysis task. Furthermore, in examples, the segmentation marker may allow the computer performing a machine learning task using the encoded first word to restore the tokenization of the first word after performing its task, e.g., of translating the input text.

In the example of FIG. 2, the word 204 is also an out-of-vocabulary word and the same process as described for the word 206 is used to provide an encoding "art@@hr@@op@@last@@y" 245 is determined for the word 204.

As a result of the example method performed on the input text 202 of FIG. 2, a modified input text 202a is produced in which the first words 204, 206 are represented by respective encodings 245, 265 each comprising sub-words determined as described above. This allows each word of the original input text 202, including out-of-vocabulary words 204, 206, to be represented by one or more embedding vectors present in the vocabulary set 210.

Example methods described herein may be used with input text provided in various different languages. For example, although examples described herein use input text provided in English, other examples methods may be used with another natural language, such as German. Methods described herein which segment an out-of-vocabulary word into sub-words existing in a known vocabulary set may be particularly useful for morphologically rich languages, such as German. For example, using German input text and a vocabulary set of similar size to above described vocabulary sets, a relatively high number of out-of-vocabulary words may be identified in the input text due to German language text typically containing a greater proportion of morphologically complex words than English text. Methods used herein may make use of sub-words within out-of-vocabulary words where these sub-words have already trained embedding vectors in a vocabulary set. This may be referred to as "transfer learning encoding", since learned embedding vectors for the determined sub-words are able to be used to represent out-of-vocabulary words which do not themselves have a learned embedding vector in the vocabulary set.

In examples, it has been found that text analysis methods performed using example methods described herein may provide an increase in accuracy over text analysis methods using a larger vocabulary set. In one example, methods of classifying input text using a Bidirectional Long-term Short-term Memory (BiLSTM) classifier were tested to determine their accuracies, and their accuracies were then compared to one another. The input text being classified was a publicly available dataset. This dataset contains multiple classes. The training data comprises more than 100,000 training samples and the test data size is approximately 6% of the training set. 5% of the training data is reserved for validation and example models are tested based on this validation.

In a first comparative example, the vocabulary set Fasttext 100 k was used to obtain embedding vectors for words of the input text for input into the BiLSTM. Words in the input text which were not in the Fasttext 100 k vocabulary when encountered in the first comparative method were discarded or marked as unknown and thus were not represented an embedding vector.

In a second comparative example, the vocabulary set Fasttext 2M (comprising around 2 million words with corresponding embedding vectors) was used in the method of text classification of the input text. Words in the input text which were not in the Fasttext 2M vocabulary when encountered in the first comparative method were discarded. Given the far larger size of the vocabulary set of the second comparative example when compared with that of the first comparative example, a lower proportion of the words of the input text are discarded in the second comparative example than in the first comparative example.

A third example method according to the present disclosure used a method of encoding out-of-vocabulary words as described in examples herein, e.g. with reference to FIGS. 1 and 2.

The first comparative example in this test achieved an accuracy of 0.911. The second comparative example in this test achieved an accuracy of 0.924, greater than the accuracy of the first comparative example since a lower proportion of words of the input text are not present in the larger vocabulary. The third example according to the present disclosure achieved an accuracy of 0.928, greater than both the first comparative example and the second comparative example. This result is surprising since the third example uses a far smaller vocabulary than the second comparative example (100,000 vs 2,000,000) yet achieved a greater accuracy. It is believed that this result may be due to the third method using a limited vocabulary of words with relatively high frequencies and thus with stable pre-trained embedding vectors. In contrast, the larger vocabulary set used in the second comparative method comprises a far larger number of words and associated embeddings, but many of these embeddings may have been trained using a low number of instances of the word (i.e. may have low frequencies), and thus may be relatively unstable. Accordingly, segmenting the out-of-vocabulary words as described in methods herein may allow for embedding vectors having high frequencies associated therewith to be used to represent out-of-vocabulary words. Thus the third example may be considered to use transfer learning encoding to encode out-of-vocabulary words wherein stable pre-trained vectors with relatively high frequencies are used to represent out-of-vocabulary words. This may advantageously allow a smaller vocabulary set to be used, potentially resulting in a saving in computational resources, while achieving high accuracy.

Example methods described herein may also achieve advantages over other methods which split out-of-vocabulary words into segments which do not have embedding vectors pre-trained therefor, i.e. which are not sub-words according to the meaning used herein. For example, as described above, segmenting an out-of-vocabulary word into sub-words which have pre-trained embedding vectors may provide an advantage in that new embedding vectors are not required to be trained to represent utilised in a text analysis process.

Figure 3:
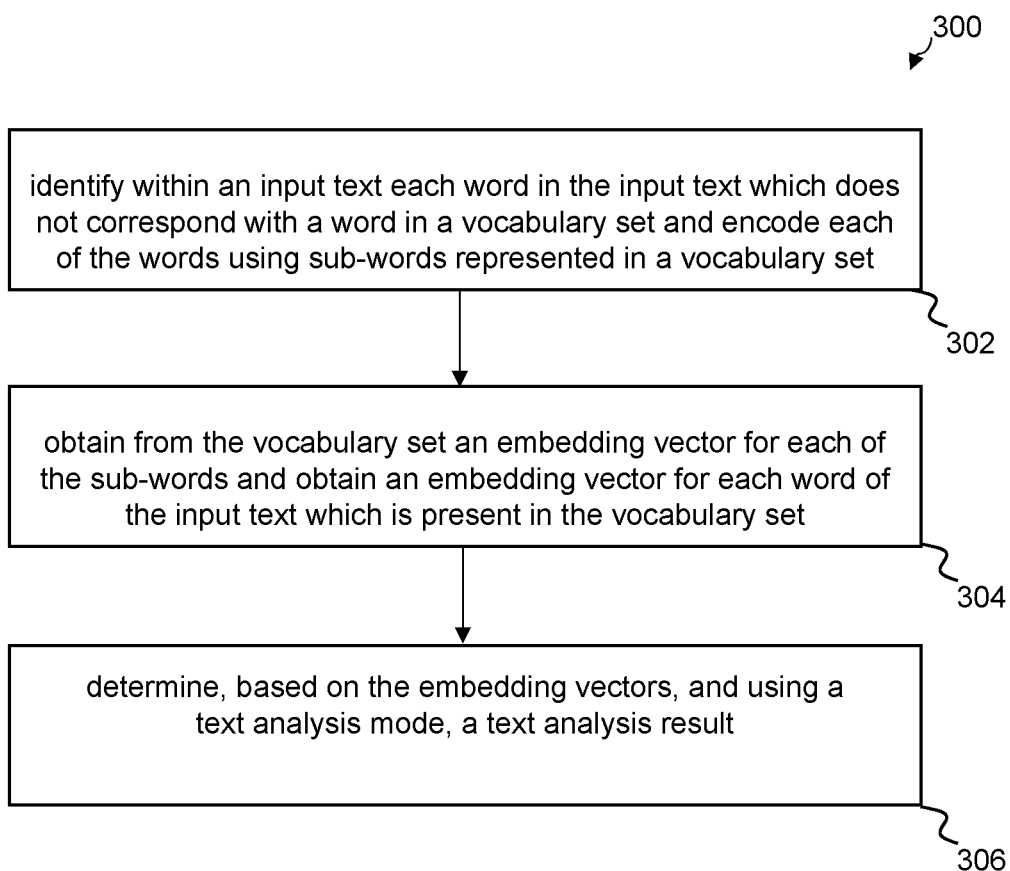
FIG. 3 is a flow diagram illustrating schematically a method according to an example.

FIG. 3 shows a flow-chart representation of an example method 300 of text analysis.

The example method 300 is a method of apply a computer-implemented text analysis process to natural language text to obtain a text analysis result. For example, the text analysis process may be a process of text classification or a process of translation from one natural language to another.

The method 300 is an example method of performing a text analysis process on input text, such as input text 200 of FIG. 2, which comprises one or more words not present in a vocabulary set 210 stored on a storage.

With reference to the example of FIG. 2, at block 302 the method comprises identifying and encoding, using an example method as described with reference to FIG. 1 and FIG. 2, each word 204, 206 in the input text 202 which does not correspond with a word in the vocabulary set 210. Block 302 therefore, in this example, results in the encodings 245, 265 for each word 204, 206 not present in the vocabulary set 210 being obtained.

At block 304, the method 300 comprises obtaining from the vocabulary set 210, for each word 203 of the natural language text which corresponds to a word in the vocabulary set, an embedding vector. Furthermore, embedding vectors for each sub-word of the encodings 245, 265 are obtained from the vocabulary set 210. Embedding vectors for each word 203 and each sub-word 261a-d are stored in the vocabulary set 210 and may be obtained through performing a look-up in the vocabulary set 210.

For example, as described above, selecting the second segmentation 262 of the word "comminuted" 206 provides the set of sub-words 262a-d each having associated embedding vectors 272a-d in the Fasttext 100 k vocabulary 210. An example of the method 300 comprises looking up embedding vectors for each of the sub-words 262a-d included in the encoding 265 and using these embedding vectors in a text analysis process.

At block 306, the obtained embedding vector/s are used in a text analysis model to obtain a text analysis result.

As mentioned above, in one example, the text analysis process is a computer-implemented method to determine a classification of the text. For example, the input text 202 is a medical text, and may in other example comprise a medical report or a medical record, or a part thereof. The aim of the text analysis process may be classifying the input text 202 for example as relating to a patient or to a particular topic. As described above, the natural language input text 202 comprises one or more words 203 present in the vocabulary 210. The natural language input text 202 also comprises one or more words, in this example two words 204, 206, not present in the vocabulary 210. An example computer implemented text analysis process comprises, based on the determined encoding 265 of the word 206, and using a text classification model, a classification of the text.

For example, a text classification model may classify different medical records according to the subject of the medical record's smoking status, for example, for classification as "smoker", "previous smoker", or "never smoked".

In another example, a text analysis task of a text classification model receiving the input text 202 may be classify the input text 202 as relating to or not relating to surgery.

In an example using the input text 202 of FIG. 2, the embedding vectors for the sub-words contained in the encodings 245, 265 and the embedding vectors for each of the words 203 may be combined to produce a representation of the input text 202. For example, the representation formed from the embedding vectors may be a matrix which combines the embedding vectors of the sub-words of the embeddings 245, 265 and the embedding vectors of words 203 in the input text 202 which are present in the vocabulary set 210.

Figure 4:
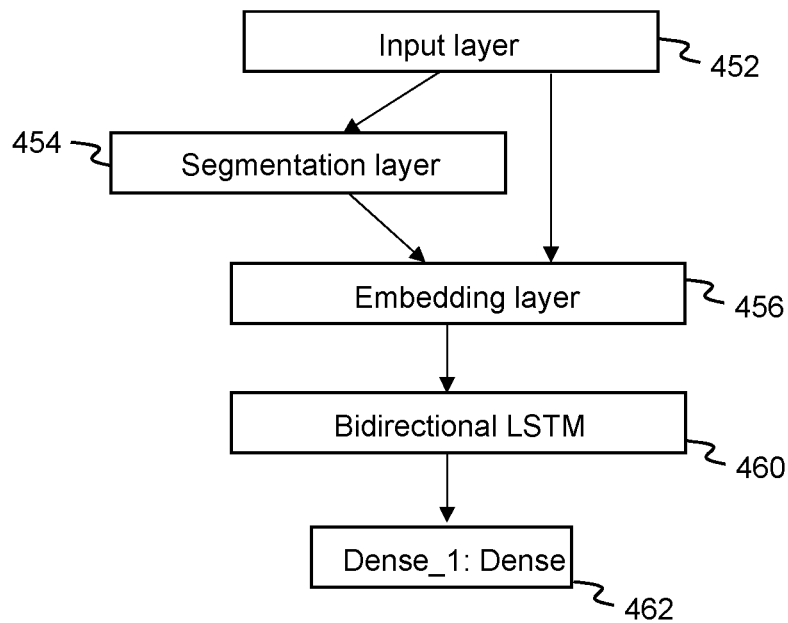
FIG. 4 is a diagram illustrating schematically an architecture of a neural network according to an example.

Referring to FIG. 4, there is illustrated schematically an example architecture of layers of a neural network in which an example text analysis method may be applied. At the top of the layer architecture is an input layer 452. For example, the input layer 452 may represent the layer at which words of the input text 202 are input to the neural network. The input layer 452 may perform a look-up of the input word in the vocabulary set 210 to identify if the input word is present in the vocabulary set 210.

Below the input layer 454 is a segmentation layer 454. For example, where a word present in the vocabulary set 210 is input into the input layer 452 the word may be sent to the embedding layer 456 without being passed to the segmentation layer 454. If the word is identified at the input layer 452 as not being present in the vocabulary set 210, i.e. the word is an out-of-vocabulary word such as words 204, 206 of the example input text 202, the word may be passed to the segmentation layer 454. The segmentation layer 454 segments the word into sub-words to provide an encoding of the word, for example as has been described in examples above.

Below the segmentation layer 454 is an embedding layer 456. The embedding layer 456 may determine from the vocabulary set a word embedding for a word received from the input layer 452 or a set of sub-words received from the segmentation layer 454.

Below the embedding layer 456 is a bi-directional LSTM neural network 460 (i.e. a Bidirectional Long Short Term Memory neural network BiLSTM). The embedding layer 454 sends the embedding vector/s for each input word to the neural network 460 and the neural network may perform a machine learning task based on these representations of the words of the input text. In examples, the BiLSTM neural network 460 deals with the input text as sequential information. The BiLSTM network comprises two hidden LSTM, a forward LSTM and backward LSTM layer model (not shown). Data processing flows forward between neurons in the forward LSTM and backward between neurons of backward LSTM with the LSTM forward and the LSTM backward processing data at the same time. Information from a previous status of the neurons is used to obtain an output from the network. Outputs of the two hidden LSTMs are added to provide a combined result of the BiLSTM layer 460.

The output of the machine learning task may be sent to a dense layer 462 below the neural network 460. Although a bi-directional LSTM neural network 460 is shown, it will be appreciated that in other examples other neural networks may be used. For example, neural network 460 may comprise a Recurrent Neural Network (RNN) architecture, in which an internal memory may be used to process arbitrary sequences of inputs. For example, as mentioned, the neural network may be a Long Short-Term Memory (LSTM) based Recurrent Neural Network (RNN) architecture, for example comprising one or more LSTM cells for remembering values over arbitrary time intervals, and/or for example comprising gated recurrent units (GRU). The neural network 460 may be a convolutional neural network (CNN). Other suitable neural networks may be used.

In another example, the input text may have been pre-processed with an example method according to that described above with reference to FIGS. 1 and 2 before being input into a network similar to that shown in FIG. 4. In such examples, the segmentation layer 454 may not be present as the input text 102 received at the input layer 452 has already been processed to provide an encoding of any out-of-vocabulary words.

Figure 5:
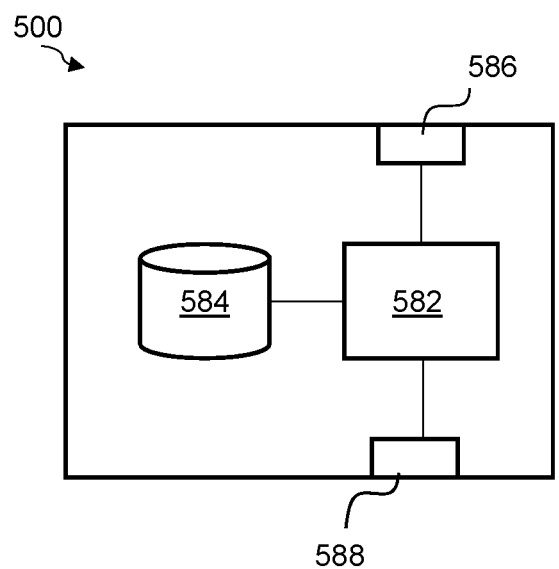
FIG. 5 is diagram illustrating schematically an apparatus according to an example.

FIG. 5 illustrates schematically an example apparatus 500, by which any one or combination of the example methods described above with reference to FIGS. 1 to 4 may be performed or implemented. The apparatus 500 comprises a processor 582 and a storage 584. The storage 584 may store instructions which when executed by the processor 582 cause the apparatus 500 to perform the method according to any one or combination of the examples described above with reference to FIGS. 1 to 4. The storage 584 may comprise a computer readable storage medium. The storage 584 may store one or more vocabulary sets, such as the vocabulary set 210 for use in methods described herein. For example, the apparatus 500 may be arranged to implement any one or combination of the steps described with reference to Figure and FIG. 2; any one or combination of the steps described with reference to FIG. 3; and/or the neural network architecture of FIG. 4. The apparatus comprises an input 586 and an output 588. For example, the input 586 may be arranged to receive input text from, one or more medical text reports or another natural language text source, as described above, for example from a user interface, a database and/or transmitted from one or more other devices (not shown). The output 588 may, for example, output the determined encodings of out-of-vocabulary words within the input text; and/or embedding vectors of words within the input text; and/or embedding vectors of sub-words of an encoding of out-of-vocabulary words within the input text; and/or classifications or translations of one or more text reports; as described above, for example to a storage (not shown), for display on a user interface of the apparatus (not shown) and/or for transmission to one or more further devices (not shown). The apparatus 500, for example including the input and output 586, 588, may implement a graphical user interface.

Architecture, such as described with reference to FIG. 4, and instructions for performing methods described above may be stored on the storage 584 when the apparatus 500 is supplied to a user. Alternatively, the architecture and/or the instructions may be supplied thereafter (e.g. in the form of a computer program product) stored on a computer readable storage medium such as a compact disk (CD), a digital versatile disk (DVD), hard disk drive, solid state drive, a flash memory device and the like. Alternatively, the architecture and/or the instructions may be downloaded onto the storage 584 via a data communication network (e.g. the world-wide web).

The above examples are to be understood as illustrative examples of the invention. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A computer-implemented method of encoding a word for use in a method of text analysis, the method comprising:
receiving input text to be analysed, the input text comprising a first word which is not represented in a vocabulary set stored on a storage, the vocabulary set comprising a plurality of words and an associated word embedding vector for each word in the vocabulary set;
identifying, the first word as a word which is not represented in the vocabulary set;
selecting one of different segmentations of the first word with which to encode the first word, wherein the different segmentations are different from each other, wherein each of the different segmentations comprises one or more sub-words, wherein a combination of all the one or more sub-words in the segmentation forms the first word, each of the one or more sub-words corresponding with a word represented in the vocabulary set and having an embedding vector in the vocabulary set; and
determining an encoding for the first word based on the one or more sub-words of the selected segmentation.

2. The method according to claim 1, wherein selecting one of the different segmentations of the first word to obtain the one or more sub-words comprises:
selecting the segmentation of the first word based on pre-determined criteria relating to the different segmentations.

3. The method according to claim 2, wherein a pre-determined criterion based upon which the segmentation of the first word is selected is a frequency of the sub-words produced by each of the different segmentations.

4. The method according to claim 3, wherein selecting one of the different segmentations of the first word comprises
determining a scoring value for each of the different segmentations based on a number of sub-words and the frequency associated with the sub-words produced by each segmentation and
selecting the segmentation based on a comparison of the scoring values.

5. The method according to claim 4 wherein the scoring values are determined based on a weighted sum of a first term relating to the number of sub-words produced by each segmentation and a second term relating to the frequency of the sub-words produced by each segmentation.

6. The method according to claim 1, wherein selecting one of the different segmentations of the first word comprises selecting a segmentation comprising a lowest number of sub-words.

7. The method according to claim 1, wherein the vocabulary set comprises individual characters of a natural language of the input text and has embedding vectors associated with the individual characters, and wherein the first word may be segmented to provide one or more sub-words comprising a plurality of characters and one or more sub-words comprising an individual character.

8. The method according to claim 1, wherein the vocabulary set comprises fewer than 500,000 words.

9. The method according to claim 8 wherein the vocabulary set is a Fasttext 100k vocabulary set or a Glove vocabulary set.

10. A system for applying a computer implemented text analysis process to natural language text to obtain a text analysis result, comprising:
a non-transitory memory device for storing computer readable program code;
a storage device including a vocabulary set stored on the storage device, the vocabulary set comprising a plurality of words and an associated word embedding vector for each word in the vocabulary set; and
a processor device in communication with the non-transitory memory device and the storage device, the processor device being operative with the computer readable program code to perform steps including:
receiving input text to be analysed, the input text comprising a first word which is not represented in the vocabulary set;
identifying the first word as a word which is not represented in the vocabulary set;
selecting one of different segmentations of the first word with which to encode the first word, wherein the different segmentations are different from each other, wherein each of the different segmentations comprises one or more sub-words, wherein a combination of all the one or more sub-words in the segmentation forms the first word, each of the one or more sub-words corresponding with a word represented in the vocabulary set and having an embedding vector in the vocabulary set;
determining an encoding for the first word based on the one or more sub-words;
identifying and encoding each word in the natural language text which does not correspond with a word in the vocabulary set to obtain an encoding for each word;
determining for each encoding an embedding vector; and
determining, based on the embedding vectors, a text analysis result.

11. The system according to claim 10, wherein the text analysis result is a text classification model and the step of determining based on the embedding vectors further comprises obtaining a classification of the natural language text.

12. The system according to claim 10, wherein the text analysis result is a translation model and the step of determining based on the embedding vectors further comprises obtaining a translation of the natural language text from a first natural language into a second natural language.

13. The system according to claim 10, wherein selecting one of the different segmentations of the first word comprises:
selecting the segmentation of the first word based on pre-determined criteria relating to the different segmentations.

14. The system according to claim 13, wherein a pre-determined criterion based upon which one of the different segmentations of the first word is selected relates to a frequency associated with the one or more sub-words produced by each of the different segmentations.

15. The system according to claim 10, wherein selecting one of the different segmentations of the first word comprises selecting a segmentation comprising a lowest number of sub-words.

16. The system according to claim 10, wherein selecting one of the different segmentations of the first word comprises:
determining a scoring value for each of the different segmentations based on number of sub-words and frequency associated with the sub-words produced by each segmentation; and
selecting the segmentation based on a comparison of the scoring values.

17. The system according to claim 16 wherein the scoring values are determined based on a weighted sum of a first term relating to the number of sub-words produced by each segmentation and a second term relating to the frequency of the sub-words produced by each segmentation.

18. The system according to claim 10, wherein the vocabulary set comprises individual characters of a natural language of the input text and has embedding vectors associated with the individual characters, and wherein the first word may be segmented to provide one or more sub-words comprising a plurality of characters and one or more sub-words comprising an individual character.

19. The system according to claim 10, wherein the vocabulary set comprises fewer than 500,000 words.

20. The system according to claim 10 wherein the vocabulary set is a Fasttext 100k vocabulary set or a Glove vocabulary set.

* * * * *